(12) United States Patent
Ward et al.

(10) Patent No.: US 11,800,179 B2
(45) Date of Patent: Oct. 24, 2023

(54) MULTIVIEW VIDEO WITH ONE WINDOW BASED ON ANOTHER

(71) Applicant: AlcaCruz Inc., San Mateo, CA (US)

(72) Inventors: Emily Ward, Belmont, CA (US);
Victor Ward, Belmont, CA (US);
Michael White, South San Francisco, CA (US)

(73) Assignee: AlcaCruz Inc., Dover, CA (US)

(*) Notice: Subject to any disclaimer, the term of this patent is extended or adjusted under 35 U.S.C. 154(b) by 126 days.

(21) Appl. No.: 17/111,211

(22) Filed: Dec. 3, 2020

(65) Prior Publication Data

US 2022/0182708 A1    Jun. 9, 2022

(51) Int. Cl.
*H04N 21/431*        (2011.01)
*H04N 21/2187*        (2011.01)
(Continued)

(52) U.S. Cl.
CPC ..... *H04N 21/4316* (2013.01); *H04N 21/2187* (2013.01); *H04N 21/21805* (2013.01);
(Continued)

(58) Field of Classification Search
CPC ........... H04N 21/4316; H04N 21/4314; H04N 21/4394; H04N 21/4858; H04N 21/2187; H04N 21/21805
(Continued)

(56) References Cited

U.S. PATENT DOCUMENTS 5,822,537 A * 10/1998 Katseff .............. H04N 21/4341
709/231
6,504,990 B1 * 1/2003 Abecassis ............ G11B 27/105
386/283
(Continued)

FOREIGN PATENT DOCUMENTS

WO    WO-2019199637 A1    10/2019
WO    WO-2022119802 A1    6/2022

OTHER PUBLICATIONS

"International Application Serial No. PCT/US2021/061110, International Search Report dated Apr. 5, 2022", 3 pgs.
(Continued)

*Primary Examiner* — John W Miller
*Assistant Examiner* — Sean N. Haiem
(74) *Attorney, Agent, or Firm* — Schwegman, Lundberg & Woessner, P.A.

(57) ABSTRACT

A digital media system is configured to provide modified concurrent video streams to a client device. A plurality of concurrent video streams is accessed. The plurality of concurrent video streams includes a first concurrent video stream. It is detected that the first concurrent video stream is selected for display in a primary window among a set of windows to be displayed on a display screen. A second concurrent video stream is generated based on the first concurrent video stream. The plurality of concurrent video streams is modified by adding the generated second concurrent video stream to the plurality of concurrent video
(Continued)

streams. The modified plurality of concurrent video streams is provided to a device configured to display the modified plurality of concurrent video streams concurrently together in corresponding different windows among the set of windows.

20 Claims, 7 Drawing Sheets

(51) Int. Cl.
  *H04N 21/439* (2011.01)
  *H04N 21/485* (2011.01)
  *H04N 21/218* (2011.01)
(52) U.S. Cl.
  CPC ..... *H04N 21/4314* (2013.01); *H04N 21/4394* (2013.01); *H04N 21/4858* (2013.01)
(58) Field of Classification Search
  USPC ........................................................ 348/565
  See application file for complete search history.

(56) References Cited

U.S. PATENT DOCUMENTS

| 7,873,972 | B2* | 1/2011 | Zaslavsky | H04N 21/4858 725/38 |
| 9,009,595 | B2* | 4/2015 | Catanese | H04N 21/47 715/716 |
| 10,459,927 | B1* | 10/2019 | Gregory | H04L 67/535 |
| 2002/0097984 | A1* | 7/2002 | Abecassis | H04N 21/4722 386/344 |
| 2003/0147010 | A1* | 8/2003 | Joung | H04N 5/45 348/565 |
| 2007/0039032 | A1* | 2/2007 | Goldey | H04N 21/4316 725/114 |
| 2007/0058937 | A1* | 3/2007 | Ando | H04N 5/76 386/248 |
| 2007/0143493 | A1* | 6/2007 | Mullig | G06F 16/40 709/232 |
| 2007/0177466 | A1* | 8/2007 | Ando | H04N 21/4147 369/13.01 |
| 2008/0010654 | A1* | 1/2008 | Barrett | H04N 21/4331 725/32 |
| 2014/0178033 | A1 | 6/2014 | He | |
| 2016/0286244 | A1* | 9/2016 | Chang | H04N 21/4788 |
| 2017/0039867 | A1* | 2/2017 | Fieldman | H04N 21/2187 |
| 2017/0289588 | A1 | 10/2017 | Lee et al. | |
| 2018/0198836 | A1 | 7/2018 | Baryla et al. | |
| 2019/0373391 | A1* | 12/2019 | Han | G06F 3/011 |
| 2020/0053401 | A1 | 2/2020 | Obara | |
| 2021/0297717 | A1* | 9/2021 | Braun | H04N 21/23439 |

OTHER PUBLICATIONS

"International Application Serial No. PCT/US2021/061110, Written Opinion dated Apr. 5, 2022", 4 pgs.

* cited by examiner

US 11,800,179 B2

MULTIVIEW VIDEO WITH ONE WINDOW BASED ON ANOTHER

TECHNICAL FIELD

The subject matter disclosed herein generally relates to the technical field of special-purpose machines that process digital media, including software-configured computerized variants of such special-purpose machines and improvements to such variants, and to the technologies by which such special-purpose machines become improved compared to other special-purpose machines that process digital media.

BACKGROUND

A machine may be configured to interact with one or more users by streaming digital media content (e.g., a video stream, an audio stream, an image, text, or any suitable combination thereof) to one or more devices that correspond to the one or more users. For example, if a user causes his or her device to request the streaming of a particular piece of digital media content (e.g., a video stream of a movie, a sports event, a video game, an esports event, a tv show, or a concert), the machine causes that piece of digital media content to be streamed to that user's device. This may be performed by the machine sending sequential portions (e.g., video frames) of the piece of digital media content to the device via a network, or otherwise causing a data repository to send sequential portions of the piece of digital media content to the device via a network. The machine may also interact with the user by receiving and responding to one or more playback commands (e.g., stop, pause, skip ahead, or skip back) communicated from the user's device while the piece of digital media content is being presented by that device.

BRIEF DESCRIPTION OF THE DRAWINGS

Some embodiments are illustrated by way of example and not limitation in the figures of the accompanying drawings.

DETAILED DESCRIPTION

Example methods (e.g., algorithms) facilitate provision or other processing of digital media (e.g., video, audio, images, text, or any suitable combination thereof), and example systems (e.g., special-purpose machines configured by special-purpose software) are configured to facilitate provision or other processing of digital media. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A digital media system is configured to support any one or more of multiple features with respect to providing concurrent video streams to a device configured to display the concurrent video streams in different windows among a set of windows on a display screen. Examples of such features include generating a second concurrent video stream to be added to the concurrent video streams based on a first concurrent video stream of the concurrent video stream and providing the modified concurrent video streams to a device configured to display the modified plurality of concurrent video streams concurrently together in corresponding different windows among a set of windows on a display screen.

Examples of such features also include detecting a trigger event involving an interaction of a user being performed with respect to a first video stream that is being presented on a display screen of a client device, the first video stream being presented concurrently with a second video stream being presented on the display screen, and, based on the trigger event, inserting one or more content items into the first video stream or the second video stream based on an inferring of an interest by the user in a portion of the first video stream, the inferring based on an analysis of the interaction.

Digital Media System

Figure 1:
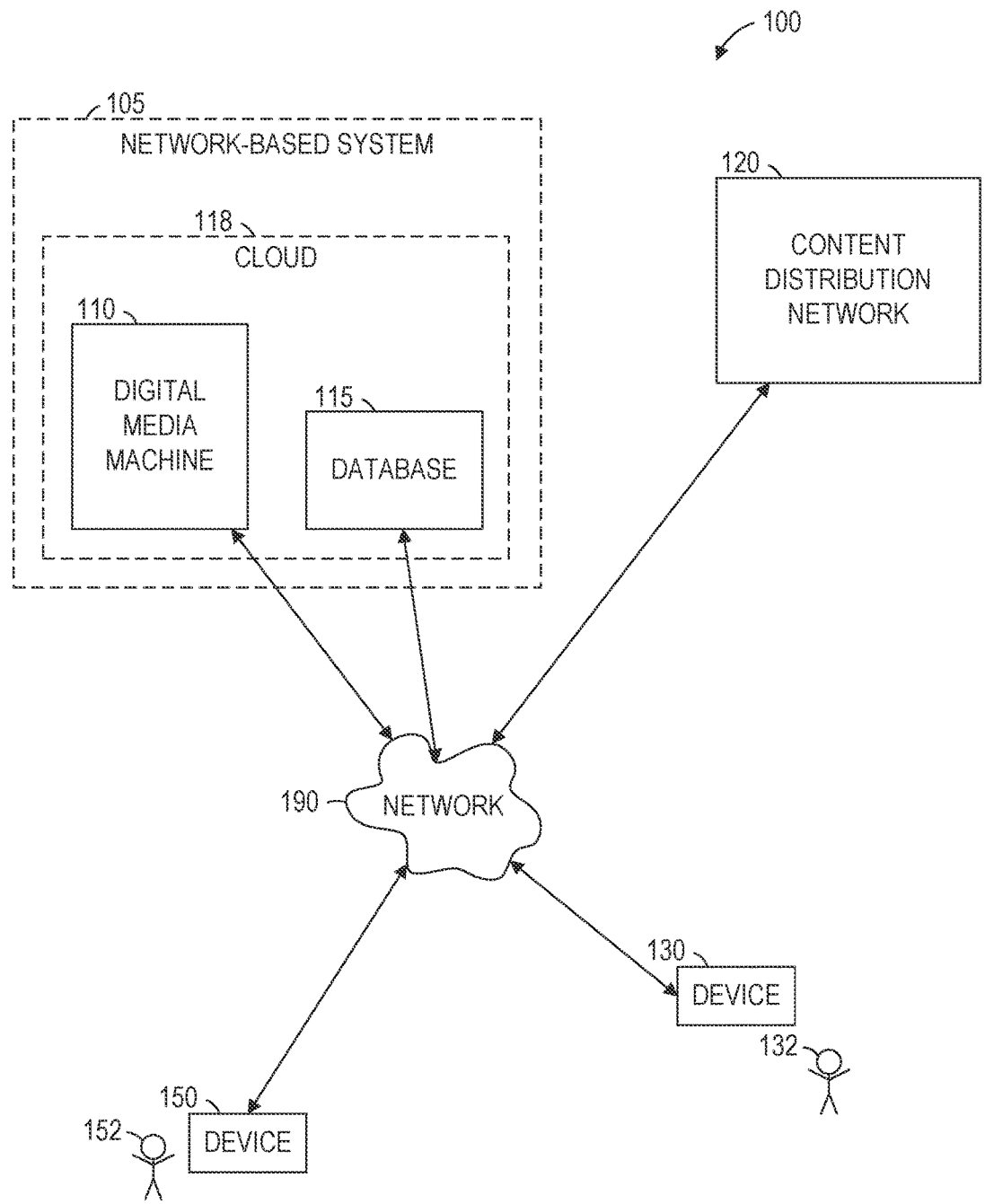
FIG. 1 is a network diagram illustrating a network environment suitable for provision of digital media or other processing of digital media, according to some example embodiments.

FIG. 1 is a network diagram illustrating a network environment 100 suitable for provision of the processing digital media, according to some example embodiments. The network environment 100 includes a digital media machine 110, a database 115, a content distribution network 120, and devices 130 and 150, all communicatively coupled to each other via a network 190. The digital media machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). In some example embodiments, the content distribution network 120 is part of the cloud 118, while in other example embodiments, the content distribution network 120 forms all or part of a third-party cloud distinct from the cloud 118 (e.g., within a third-party network-based system distinct from the network-based system 105). The digital media machine 110, the database 115, the content distribution network 120, and the devices 130 and 150 may each be implemented in one or more special-purpose (e.g., specialized) computer systems, in whole or in part, as described below with respect to FIG. 12.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130 (e.g., a client device configured to present digital media, including virtual-reality content). For example, the device 130 may be a desktop computer, a vehicle computer, a tablet computer, a navigational device, a portable media device, a smart phone, a virtual reality headset or glasses, or a wearable device (e.g., a smart watch, smart glasses, smart clothing, or smart jewelry) belonging to the user 132. Likewise, the user 152 is associated with the device 150 and may be a user of the device 150 (e.g., a client device configured to present digital media, including virtual-reality content). As an example, the device 150 may be a desktop computer, a vehicle computer, a tablet computer, a navigational device, a portable media device, a smart phone, a virtual reality headset or glasses, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 12, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any similar networks, or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The digital media machine 110 provides data streaming services and manages streaming of media content, including video (e.g., multi-view video), augmented reality (AR), virtual reality (VR), and/or mixed reality (MIR) media content. The digital media machine 110 may find useful applications in entertainment (e.g., sports, video games, esports, concerts, movies, tv shows, or documentaries), education (e.g., academic, corporate, or professional training), industry (e.g., tourism or medicine), or any suitable combination thereof, including live or otherwise low-latency applications (e.g., news reporting or gaming). The digital media machine 110 may accordingly provide one or more data streams of virtual-reality content itself, cause one or more of such data streams to be provided by the content distribution network 120, or any suitable combination thereof. The virtual-reality content may be provided to one or more client devices, such as one or more of the devices 130 and 150 (e.g., a virtual-reality headset, a mobile device, or other device capable of displaying virtual-reality content).

Concurrent Display of Multiple Video Streams

Figure 2:
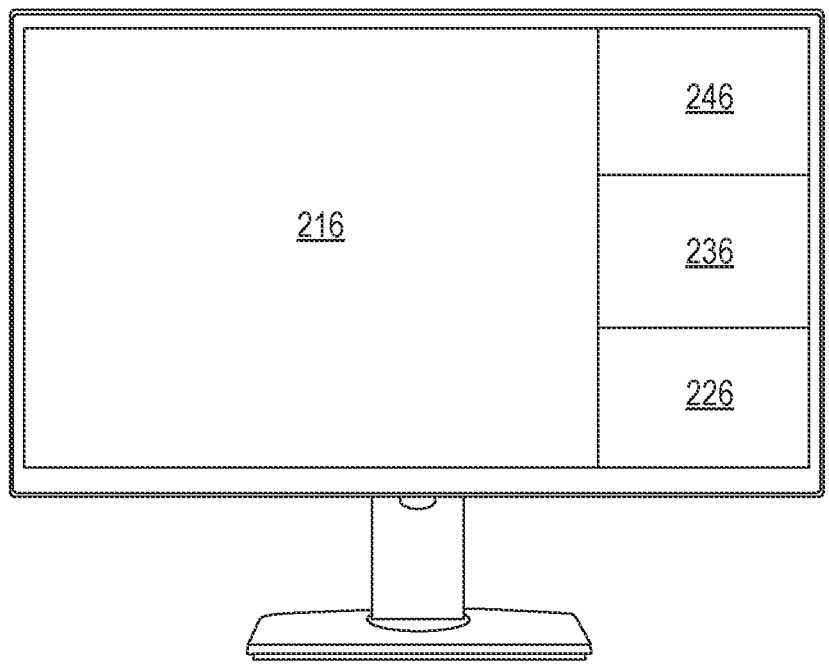
FIG. 2 is a diagram illustrating an example user interface presented on a display screen of a client device for viewing multiple video streams concurrently.

FIG. 2 is a diagram illustrating an example user interface presented on a display screen of a client device (e.g., the device 150 or the device 130). In the example user interface, a multiple concurrent video streams are displayed concurrently together in corresponding different windows among a set of windows. The set of windows includes a primary window 216 and secondary windows 226, 236, and 246. These windows 216, 226, 236, and 246 are respectively assigned to different regions of the display screen and concurrently (e.g., simultaneously) displayed together on the display screen. As shown in FIG. 2, the window 216 has been selected (e.g., manually by a viewer or automatically by machine) as a primary window for prominent display in the largest region of the display screen, while the other windows 226, 236, and 246 are secondary windows allocated to the three smaller regions of the display screen for less prominent display to indicate their availability for selection as the primary window. In example embodiments, there are multiple configurable layouts for the set of windows (e.g., for presenting multi-view video content). For example, the windows 216, 226, 236, and 246 may be of equal size, the primary window 216 may be placed at a different location or have a different shape, the secondary windows may each have different sizes or be arranged around the primary window in a different fashion than what is depicted in the example user interface of FIG. 2. Additionally, there may be different numbers of secondary windows than what is depicted in the example user interface of FIG. 2 (e.g., there may be more than three or less than three secondary windows). In example embodiments, the display screen may be configured to scroll (e.g., if the screen is too small to accommodate the configured layout of the windows). In example embodiments, an administrative user interface may be provided to allow an administrator or user to specify the layout or customize the layout for different users or different devices or to select from a number of predefined layouts.

In some example embodiments, the primary window is selected manually by a viewer. For example, the display screen may be or include a touch-sensitive touchscreen, and the viewer may perform a touch or swipe on one of the smaller regions of the display screen to cause the digital media machine 110 to select the corresponding window (e.g., window 226, 236, or 246) as the new primary window to be prominently displayed in the largest region of the display screen, whereupon the previous primary window (e.g., window 216) would be reassigned to the touched or swiped smaller region of the display screen and displayed therein. In example embodiments, each video stream may include its own corresponding audio track (e.g., with its own corresponding audio mix). Accordingly, the selection of any window as the new primary window may additionally select the corresponding audio track from the same video stream, such that the audio track for the primary window is presented (e.g., played) concurrently with the display of the primary window in the largest region of the display screen. In example embodiments, the audio tracks from other (e.g., secondary or otherwise non-selected) windows may be attenuated in the selected audio mix, muted in the selected audio mix, or entirely absent from the selected audio track.

In example embodiments, at least one of the concurrent video streams for the secondary windows 226, 236, and 246 may have been generated based on the concurrent video stream for the primary window 216, and provided to the device concurrently with the video stream for the primary window 216, as described in more detail below. For example, the digital media machine 110 may generate a supplemental video stream in which selected content (e.g., from one or more content sources via the network 190) that is relevant to the video stream for the primary window 216 is inserted, assign the supplemental video stream to one of the windows 226, 236, and 246, and provide the supplemental video stream concurrently with the primary video stream to the display screen, which may be configured (e.g., via suitable client-side software) to concurrently display the primary window and secondary windows as discussed above.

In example embodiments, one or more of the supplemental video streams for the windows 226, 236, and 246 may be individually selected by the viewer (e.g., via a suitable graphical user interface generated by the digital media machine 110 or the display screen and presented on the display screen) and each supplemental video stream may be individually assigned by the viewer (e.g., via the graphical user interface) for presentation in its corresponding window.

In certain example embodiments, the primary window is selected automatically by a machine (e.g., by the digital media machine 110, the display screen, or both). For example, the machine may execute or otherwise operate an artificial intelligence engine configured to perform recognition of one or more visual patterns in the supplemental video streams for the windows 216, 226, 236, and 246, and then select the primary window based on such visual pattern recognition. As a more specific example, supposing that the four supplemental video streams for the windows 216, 226, 236, and 246 each represent one of four different (American) football games, the artificial intelligence engine may recognize when a scoring event (e.g., a touchdown or a field goal) has a heightened likelihood of occurrence. This may include detecting that a scrimmage line marker or a first-down marker depicted in one of the supplemental video streams has moved inside a team's own 20-yard line (e.g., by using optical character recognition to detect the n-gram "20" and using visual pattern recognition to detect a triangular disambiguation symbol and the relevant marker). Based on this detection, the machine may automatically select the corresponding window displaying the corresponding supplemental video stream as the primary window. This may have the effect of dynamically choosing which one of the four supplemental video streams will be presented in the largest region of the display screen.

According to various example embodiments, other algorithms are implemented to predict increased likelihoods of a scoring event. For example, the artificial intelligence engine may be configured to predict when the football will reach either team's 20-yard line. As another example, supposing that the four supplemental video streams for the windows 216, 226, 236, and 246 each represents one of four different basketball games, the artificial intelligence engine may be configured to predict when a specific basketball player is likely to score. For example, such a detection may be based on the player's detected position on the basketball court (e.g., outside the 3-point line) in comparison to the player's shooting statistics accessed from a sports database via the network 190).

Generating a Second Video Stream Based on a First Video Stream

Figure 3:
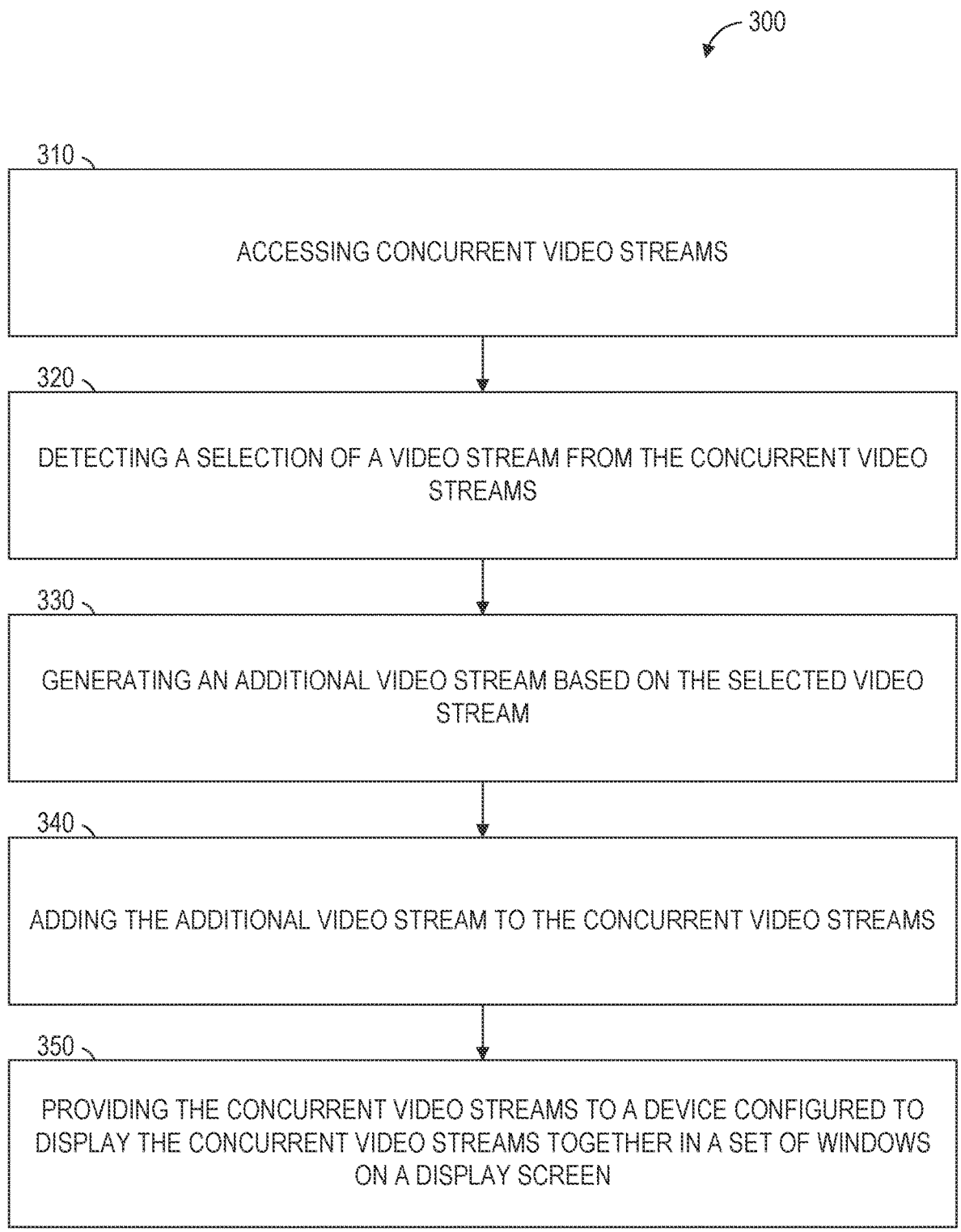
FIG. 3 is a flowchart illustrating operations of a method for providing modified concurrent video streams to a client device, according to some example embodiments.

In some example embodiments, the digital media machine 110 or sonic other machine within the network-based system 105 is configured to generate a video stream for adding to a plurality of concurrent video streams based on an additional video stream in the plurality of concurrent video streams for providing to a client device (e.g., the device 130 or the device 150). One example method 300 for providing modified concurrent video streams to a client device is illustrated in FIG. 3.

At operation 310, a plurality of concurrent video streams is accessed. The plurality of concurrent video streams is to be displayed concurrently together on a display screen. The plurality of concurrent video streams includes a first concurrent video stream. In some embodiments, the accessing of the plurality of concurrent video streams is performed as all or part of accessing a multiwindow media stream that includes the plurality of concurrent video streams.

At operation 320, it is detected that the first concurrent video stream among the plurality of concurrent video streams is selected for display in a primary window among a set of windows to be displayed on the display screen.

At operation 340, a second concurrent video stream is generated for adding to the plurality of concurrent video streams based on the first concurrent video stream. In example embodiments, the generating of the second concurrent video stream is based on the first concurrent video stream being selected for display in the primary window.

At operation 350, the plurality of concurrent video streams is modified by adding the second concurrent video stream to the plurality of concurrent video streams. In example embodiments, each concurrent video stream in the modified plurality of concurrent video streams is displayable in a corresponding different window among the set of windows to be displayed on the display screen. In some embodiments, the modifying of the plurality of concurrent video streams is performed as all or part of modifying a multiwindow media stream that includes the plurality of concurrent video streams.

At operation 360, the modified plurality of concurrent video streams is provided to a client device. The client device is configured to display the modified plurality of concurrent video streams concurrently together in the corresponding different windows among the set of windows on the display screen. In sonic embodiments, the providing of the modified plurality of concurrent video streams to the client device is performed as all or part of providing a multiwindow media stream to the device.

Figure 4:
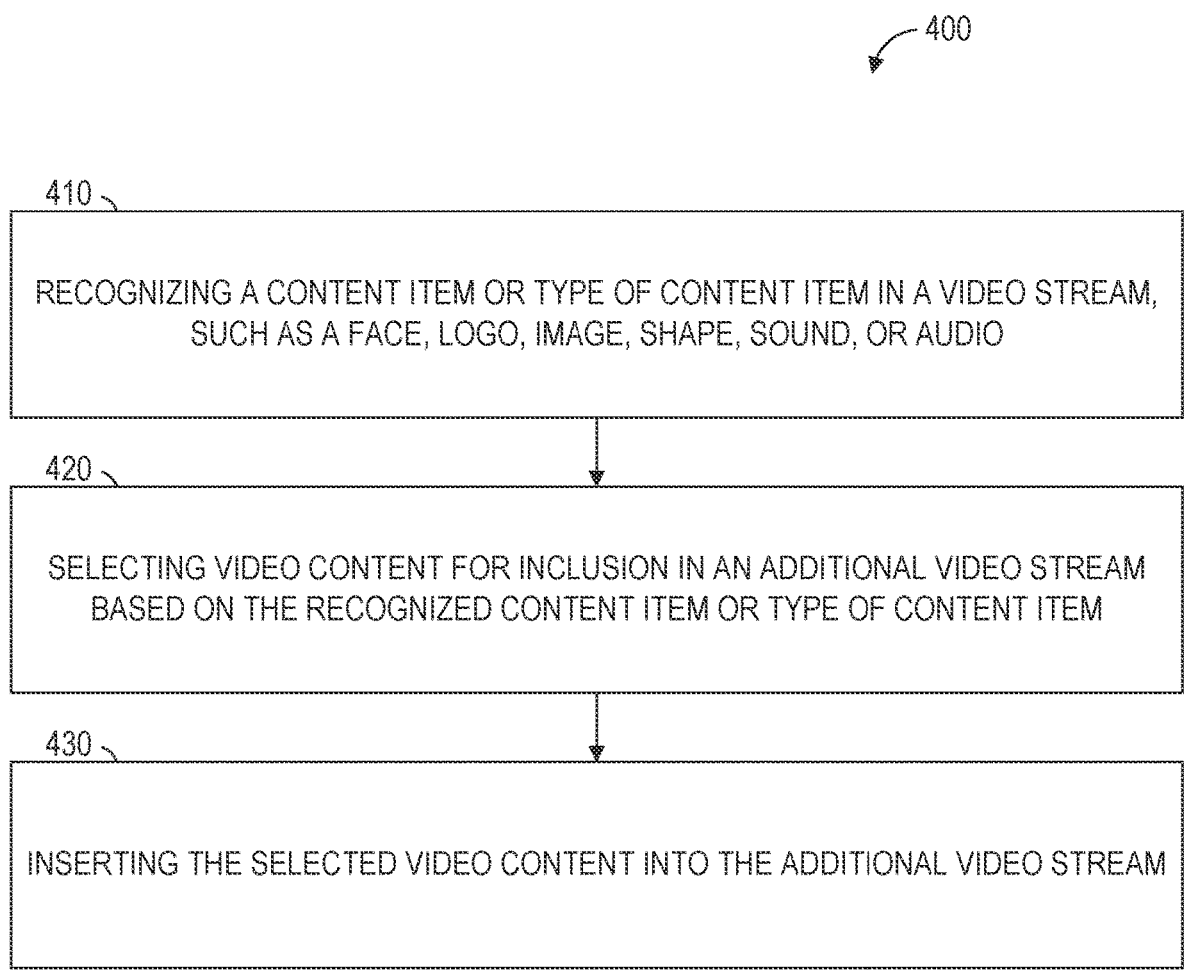
FIG. 4 is a flowchart illustrating operations of a method for inserting selected video content into a second video stream based on content recognized in a first concurrent video stream, according to some example embodiments.

In some example embodiments, the generating of the second concurrent video stream based on the first concurrent video stream by the digital media machine 110 or some other machine within the network-based system 105 includes inserting selected content into the second concurrent video stream that is associated (e.g., by the database 115, such as with a link, mapping, or other indicated correspondence relationship) with a specific content item or a type of content item recognized in the first concurrent video stream. One example method 400 for inserting selected video content into the second video stream based on content recognized in the first concurrent video stream is illustrated in FIG. 4. According to various example embodiments of the systems and methods discussed herein, all or part the method 400 may be performed separately or performed as part of the method 300 (e.g., as part of operation 330 or at some other point prior to performing operation 340).

At operation 410, a content item or a particular type of content item is recognized in the first concurrent video stream, such as a face, logo, image, shape, sound, or audio. In example embodiments, the recognizing of the specific content item or specific type of content item is performed by applying machine learning and artificial intelligence, for example, by applying a machine-learned model or trained neural network to the first concurrent video stream. In example embodiments, the content item is any object or type of object recognized by any one of a plurality of machine-learned models that have been configured (e.g., by an administrator) to monitor the first concurrent video stream in real time. In example embodiments, the plurality of machine learned models is selected from a library of machine-learned models (e.g., via an administrative user interface) for applying to the first concurrent video stream.

At operation 420, an associated content item is selected for inclusion in an additional video stream based on the recognized type of content item or specific content item. In example embodiments, the associated content item may include an advertisement, a portion of a social media feed, a promotion, a news, text or video clip, fan engagement content, an alternative camera angle, or an aggregation of such content items pertaining to the recognized content item (e.g., face, logo, image, shape, sound or audio) recognized in the first concurrent video stream. Thus, for example, based on the face of Steph Curry being recognized in the first concurrent content stream, the associated content item may be an advertisement featuring Steph Curry or a product promoted by Steph Curry, a portion of a social media post pertaining to Steph Curry, a news, text or video clip pertaining to Steph Curry, a different camera angle featuring Steph Curry, fan engagement content, or an aggregation of such associated content items. Or, based on a team logo of the Golden State Warriors being recognized in the first concurrent video, the associated content item may be an advertisement featuring Golden State Warriors merchandise, a portion of a social media post pertaining to the Golden State Warriors, an alternative camera angle featuring the Golden State Warriors or a player from the Golden State Warriors, or an aggregation of such associated content items. In example embodiments, the portion of the social media post may be filtered based on the recognized content item, such as by the recognized face, logo, image, shape, sound or audio. In example embodiments, the aggregation of the associated content items may be prioritized based on a detected trend, such as social media upvotes pertaining to the associated content item.

In example embodiments, the associated content item is selected from a pool of possible content items. For example, a pool of content items, such as advertising content items, including videos, thumbnails, and so on, may be included in a database (e.g., the database 115). In example embodiments, metadata associated with the pool of content items may be generated and stored in conjunction with the pool of content items. The metadata may be generated (e.g., by one or more processes of the network-based system 105, such as the digital media machined 110). The metadata may include information associated with each content item in the pool of content items, such as a file name, title, length, size, hashtags, and objects detected within each content item (e.g., as detected by one or more of the plurality of machine-learned models incorporated into one or more processes of the network-based system 105 for identifying objects). For example, based on applications of various machine-learned models for identifying objects within the content items, it may be determined that one or more of the content items includes NBA players with "Black Lives Matter" shirts. Or it may be determined that the content items include one or more hashtags associated with the Black Lives Matter movement. Or it may be determined that one or more of the content items includes a prompt to join the Black Lives Matter movement.

Other information associated with each content item that may be stored as metadata associated with the content item may include information pertaining to geometric shapes (e.g., squares, circles, triangles), organic shapes (e.g., shapes representing things in the natural world), abstract shapes (e.g., shapes representing everyday objects or people), and the relationships between those types of shapes, detected within each content item, colors detected within each content item, an emotional category associated with the content item (e.g., such as happiness, sadness, fear, disgust, anger, surprise, love, violence, peacefulness). In example embodiments, the emotional sentiment associated with each content item may be machine-learned based on objects identified within the content item, facial recognition of emotional expressions within the content item, textual-recognition of words identified within the content item, or analysis of other metadata items associated with the content item, such as hashtags.

Based on the objects identified within the content items, one or more processes of the network-based system 105, an association of the content item with an organization. For example, the Black Lives Matter organization may be identified. This organizational association may be machine-learned (e.g., based on administrative actions taken with similar content items to associate content items having similar objects with the organization). The organizational association may be stored as an additional metadata item in association with the content item.

In example embodiments, one or more processes may be used to generate metadata for each video stream using the same techniques described above. In example embodiments, the metadata for each video stream may and the metadata for each content item in the pool that may be inserted into the video stream are used to generate suggestions for matchmaking of content items to video streams.

In example embodiments, an administrative user interface may be generated and presented on a client device to enable a content item creator or owner to use the metadata identified in the possible video streams to specify preferred matches of the content item to the video streams. For example, a content creator may be provided with an option to insert the content item into video feeds in which particular objects have been identified, such as a ball (e.g., a football, a basketball, or a baseball), a logo (e.g., an NBA or NFL team logo), a particular professional athlete (e.g., identified with facial recognition), a word or phrase (e.g., identified with textual recognition), and so on. In this way, rather than choosing matching criteria from infinite possibilities, the content creator or owner is provided with options to match a content item to particular video streams based on objects or attributes that have been identified in those video streams.

In example embodiments, in addition or instead of matchmaking specified by the creator of the content items in the pool, the matchmaking may be based on information or metadata known about the end user who is viewing the content streams. In example embodiments, information pertaining to the user and/or client device is collected, such as geographic information about the user and types of video streams that have been previously streamed to a client device of the user. In example embodiments, the information about the types of content that the user has streamed may be broken down by time period, such that, for example, it may be identified that the client device typically receives content that is appropriate for minors (e.g., people under 18 years of age) until a certain time (e.g., 10 pm), but that the client device receives content that is more appropriate for an adult audience after that certain time. In example embodiments, information pertaining to the previous content consumed by the user, including metadata items generated from the content, may be used for matchmaking of additional content items that are to be inserted into subsequent video streams received by the client device.

Additionally, information or metadata pertaining to an event occurring within the video stream may be generated and collected, such as the current score in an NBA game being presented within the video stream.

In an example embodiment, the content item from the pool may be matched to the content stream based on a determination from the geographic data that the user of the client device is likely a fan of one of the teams (e.g., based on the client device being based on San Francisco, it may be determined that the user is likely a fan of the Golden State Warriors). Further, the matchmaking may be based on an event trigger within the game indicating a favorable condition for the Warriors, such as the Warriors going on an 118-point run. Thus, for example, the content item may be placed in the content stream at an Opportune moment for the content creator of the content item (e.g., a Warriors merchandise item), when the user of the client device is most likely to be interested in the content item.

In example embodiments, metadata generated for previously-received video streams of a client device may be collected to determine, for example, trends of common elements across the video streams. In example embodiments, a particular client device or user may be categorized as a lover or hater of certain elements or patterns of interactions with a certain degree of confidence (e.g., by a machine-learned algorithm). Thus, the matchmaking of content items to video streams may further take into account whether the content item is suited for the user based on whether the user is a lover or hater of sonic of the elements associated with the content item.

At operation 430, the selected content is inserted into the second concurrent content stream and provided concurrently with the first concurrent content stream to a client device for displaying concurrently together in corresponding different windows among a set of windows on a display screen.

Figure 5:
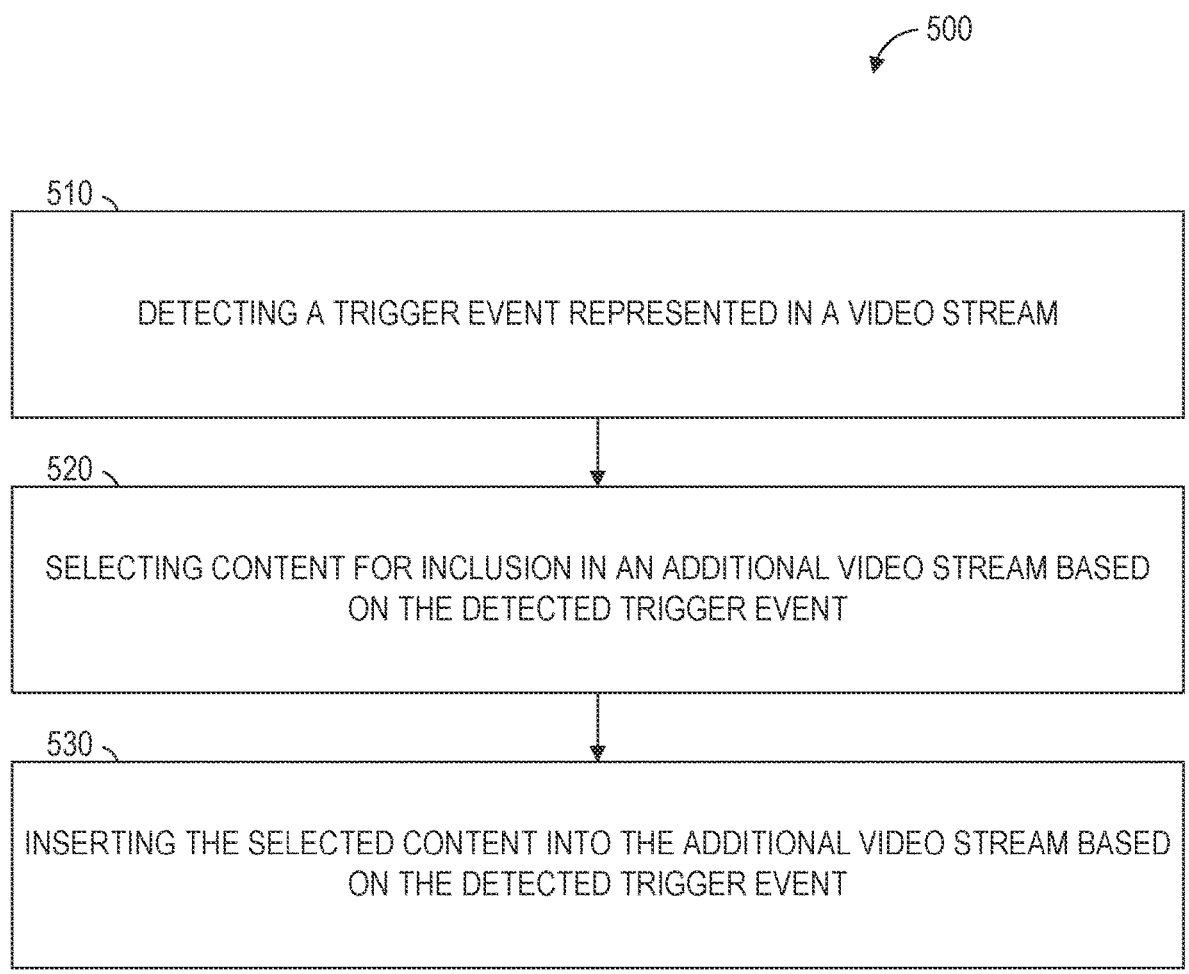
FIG. 5 is a flowchart illustrating operations of a method for inserting selected video content into a second video stream based on detecting of a trigger event in a first concurrent video stream, according to some example embodiments.

In some example embodiments, the generating of the second concurrent video stream based on the first concurrent video stream by the digital media machine 110 or some other machine within the network-based system 105 includes inserting selected content into the second concurrent video stream that is associated with a trigger event detected in the first concurrent video stream. One example method 500 for inserting selected video content into the second video stream based on detecting of a trigger event is illustrated in FIG. 5. According to various example embodiments of the systems and methods discussed herein, all or part the method 500 may be performed separately or performed as part of the method 300 (e.g., as part of operation 330 or at some other point prior to performing operation 340).

At operation 510, a trigger event is detected in the first concurrent video stream. Examples of trigger events may include video trigger events and audio trigger events. Examples of video trigger events and audio trigger events may include video signs or audio signs, respectively, of light or heavy action occurring in the first concurrent video stream as measured by, for example, movement of recognized objects, a level of crowd noise, or a level of commentator volume. In example embodiments, the audio trigger event may be recognition (e.g., with natural language processing (NLP) software or other voice recognition software) of utterances of specific words or phrases (e.g., "Prada jacket") or interjections (e.g., "Bang!" or "Gooooallll!"). In example embodiments, the detecting of a trigger event is performed by applying machine learning and artificial intelligence, for example, by applying a machine-learned model or trained neural network to the first concurrent video stream. In example embodiments, the machined-learned model is trained to detect which audio or video trigger has more weight or bias for triggering insertion of particular secondary content. In example embodiments, a real-time inference system is used to detect the effectiveness of secondary content (e.g., based on a behavior of the user with respect to the secondary content, such as an engagement with the secondary content) or an improvement of a desired behavior of the user with respect to the primary content (e.g., a longer viewing time by the user). In example embodiments, the trigger event may be based on an analysis of one or more video streams themselves, an analysis of user behavior or user interaction with respect to the one or more video streams, or a combination of such analyses.

For example, the trigger event may be based on user behavior with respect to a user interface in which the media content is being presented on a client device. For example, a trigger event may relate to a selection or other manipulation (e.g., a zooming, moving, resizing, focusing, or rewinding) of a content item being presented in a window, such as a selection of an item detected based on an interaction with a touchscreen display of the client device or a peripheral device connected to the client device (e.g., a mouse or a VR, AR, or MR device). Thus, for example, a user behavior indicative of an interest of a user in a content item being presented in a graphical user interface of the client device, such as a tapping on a display screen of the client device at a location of the content item or on a specific screen or view, may constitute a trigger event.

In example embodiments, types of user interactions with a display screen or other peripheral device associated with a client device may include tapping, double tapping, soft presses, hard presses, short touches, long touches, and so on. Each of these types of touches may be associated with different weightings of inferred levels of interest of the user in one or more content items being presented on the display screen. For example, a content item that is the focus of a double tap, hard press, or long touch may be given more weighting than a content item that is the focus of a single tap, a soft press, or a short touch, respectively.

In example embodiments, the user interaction may include a detected movement of the user, such as a hand movement, a head movement, body movement, or an eye movement of the user. For example, it may be detected (e.g., via a peripheral device, such as a VR headset) that a user has moved his head in the direction of a particular window on the display screen or one or more particular content items being displayed within the particular window. Or it may be detected (e.g., via a peripheral device, such as a hand control associated with a VR device) that the user has pointed to or made a hand gesture with respect to a content item being presented within a particular window. Or it may be detected (e.g., via an eye tracker device) that the user has focused his gaze on a particular content item. In example embodiments, an analysis of the movement may include inferring a level of interest of the user in the content item that is the focus of the movement based on various factors associated with the movement, such as a speed of the movement, a period of time over which the movement is held, a type of the movement, and so on. For example, pointing at a content item may be given more weight than merely looking at the content item.

In example embodiments, the user behavior may include a sound or an utterance by the user, like verbal utterance used to control a personal digital assistant, such as an Amazon Alexa device, or a textual utterance entered into a chat window of a chatbot. For example, it may be inferred that a user is interested in a particular content item being presented in a window of a display screen based on a detection that the user has uttered a word or phrase that is associated with the content item.

In example embodiments, an interest of the user in a content item may be inferred based on an interaction by the user with a device associated with the presentation of the video streams, such as a remote control or a volume control. For example, it may be inferred that a user is interested in a particular content item based on the user increasing a volume associated with the video stream while the particular content item is being presented. Or a lack of interest by the user in one or more content items may be inferred based on the user decreasing a volume associated with the video stream while the one or more content items are being presented. Similarly, using the remote control to select a different primary window, rewind content items being presented, fast forward past particular content items, pause content items, and so on may be used to infer user interest in one or more content items.

In example embodiments, user data, such as anonymous user data pertaining to the client device on which the video streams are being presented, including geolocation data, viewing or purchasing history, search history, user demographic data, chat or social data, IP address data, and so on, may also be used to infer user interest in one or more content items.

In example embodiments, features associated with user behavior are used to train a machine-learned model or neural network for identifying levels of user interest in content items. The features may include one or more of the features discussed above pertaining to types of user behavior. The machine-learned model may then be applied to infer the level of user interest in content items being presented to the user based on user behavior. The accuracy of the determination of the level of user interest may be measured based on various factors, such as a level of engagement by the user with the additional content that is inserted into the one or more video streams based on the inferring of the user interest in particular video content. The machine-learned model may then be retrained based on the measurement of the accuracy.

At operation 520, an associated content item is selected for inclusion in an additional video stream, or not, based on the detecting of the trigger event. For example, based on a detection of an audio trigger event or a video trigger event that is indicative of heavy action, no associated content item may be selected. In contrast, based on a detection of an audio trigger event or a video trigger event that is indicative of light action, an associated content item may be selected (e.g., as described above with respect to operation 420 of FIG. 4).

At operation 530, the selected content is inserted into the second concurrent content stream and provided concurrently with the first concurrent content stream to a client device for displaying concurrently together in corresponding different windows among a set of windows on a display screen.

Figure 6:
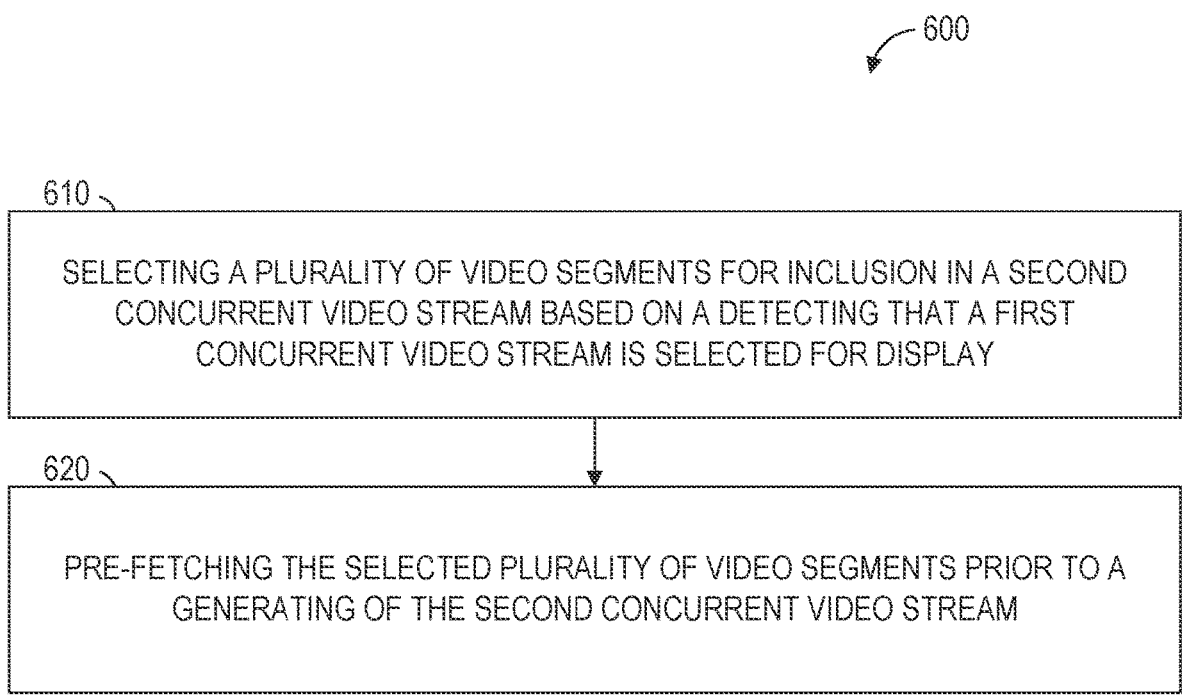
FIG. 6 is a flowchart illustrating operations of a method for pre-fetching video content associated with content recognized in a first concurrent video stream for inserting into a second concurrent video stream when a trigger event occurs, according to some example embodiments.

In some example embodiments, the generating of the second concurrent video stream based on the first concurrent video stream by the digital media machine 110 or some other machine within the network-based system 105 includes pre-fetching one or more associated content items based on one or more content items recognized in the first concurrent video stream. One example method 600 of pre-fetching associated video content is illustrated in FIG. 6. According to various example embodiments of the systems and methods discussed herein, all or part the method 600 may be performed separately or performed as part of the method 300 (e.g., prior to performing operation 330 or at some other point prior to performing operation 340). For example, when a list of possible video streams is provided to a client device for selection, various information pertaining to each of the video streams is collected, such as thumbnail images, titles, and so on of secondary content items). Then, when a selection is made, at least some of the secondary content is already fetched, allowing the insertion of the secondary content to proceed with little, if any, pausing of the video streams/

At operation 602, one or more associated content items are identified as being associated with content items recognized in the first concurrent video stream (e.g., as described above with respect to FIG. 4 and FIG. 5).

At operation 604, the one or more associated content items are pre-fetched from a memory prior to a determination being made that the one or more associated content items will be inserted into a second concurrent video stream before a trigger event is detected).

Subsequently, upon the determination being made that the one or more associated content items are to be inserted into the second concurrent video stream, such as when a level of action associated with the first concurrent video stream dies down to at least a predetermined or configurable level, the pre-fetched content items are inserted into the second concurrent video stream and provided concurrently with the first concurrent content stream to a client device for displaying concurrently together in corresponding different windows among a set of windows on a display screen.

When these effects are considered in aggregate, one or more of the methodologies described herein may obviate a need for certain efforts or resources that otherwise would be involved in providing improved user experiences with presentation of multiple streams of video content in a user interface on a device. Efforts expended by a user in perceiving or otherwise obtaining such improved user experiences, or by an administrator in hosting or otherwise providing such improved user experiences, may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 7:
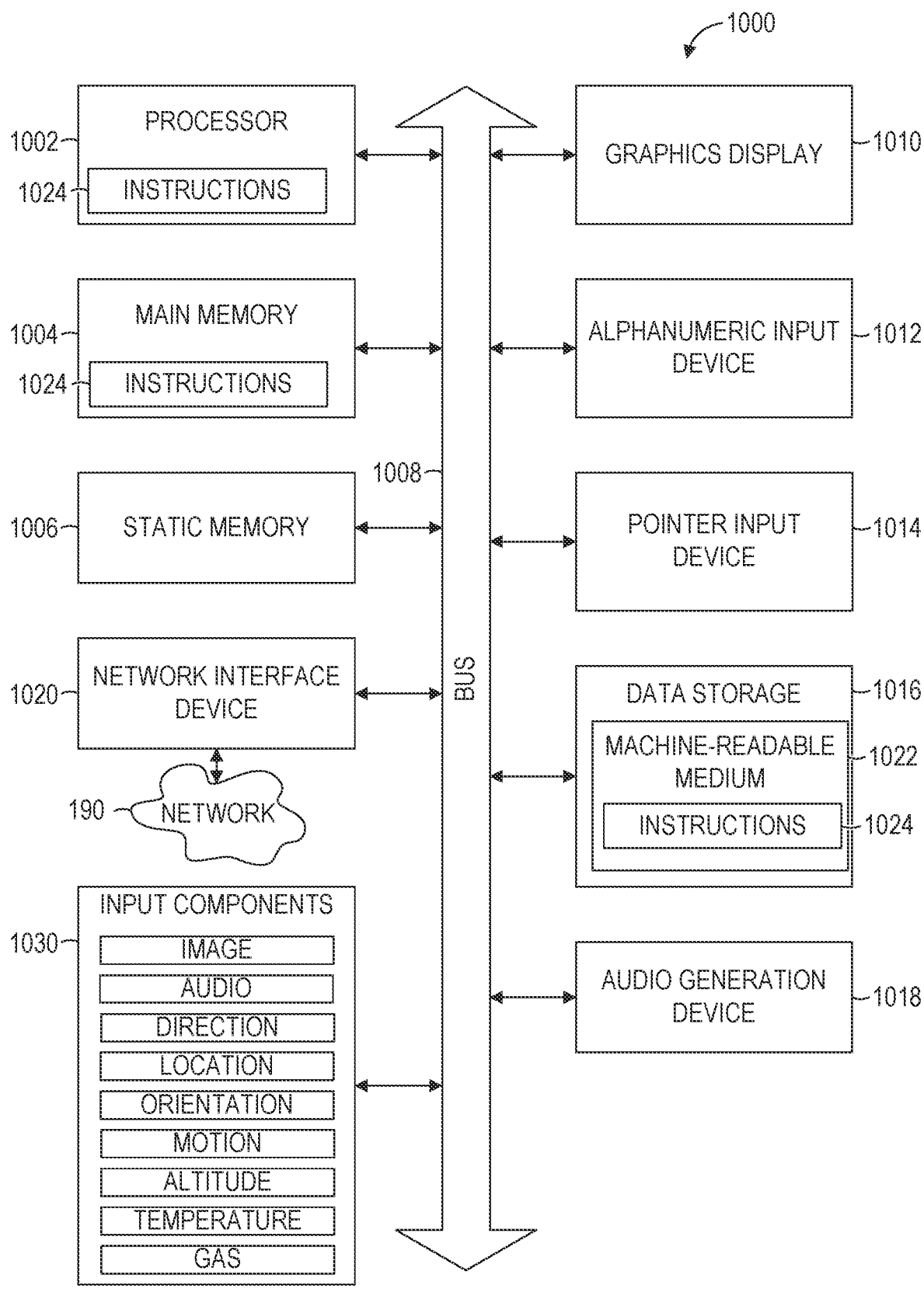
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 1000 in the example form of a computer system (e.g., a computer, which may be a supercomputer) within which the instructions 1024 (e.g., software, a program, an application, an applet, an app, or other executable code) for causing the machine 1200 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer (e.g., a supercomputing server), a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more quantum processing units, one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LEI)) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1006, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device), and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1030 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1024 for execution by the machine 1000 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module, Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

accessing, by one or more processors of a machine, a plurality of concurrent video streams to be displayed concurrently together on a display screen, the plurality of concurrent video streams including a first concurrent video stream;

detecting, by the one or more processors of the machine, that the first concurrent video stream among the accessed plurality of concurrent video streams is selected for display in a primary window among a set of windows to be displayed on the display screen;

detecting, by the one or more processors of the machine, multiple trigger events represented in the first concurrent video stream;

determining, by the one or more processors of the machine and using a trained machine-learning model, a maximum weighted trigger event among the detected multiple trigger events represented in the first concurrent video stream;

automatically selecting, by the one or more processors of the machine and without user input, multiple video content items from a pool of available video content items for inclusion of the automatically selected multiple video content items in a second concurrent video stream to be generated from the multiple video content items and then added to the accessed plurality of concurrent video streams that includes the first concurrent video stream selected for display in the primary window, the automatic selecting of the multiple video content items being based on the maximum weight trigger event determined using the trained machine-learning model;

generating, by the one or more processors of the machine and based on the first concurrent video stream being selected for display in the primary window, the second concurrent video stream to be added to the accessed plurality of concurrent video streams by inserting the automatically selected multiple video content items into the second concurrent video stream based on a first detection of a first trigger event indicating light action in the first concurrent video stream and suspending the inserting of the automatically selected multiple video content items based on a second detection of a second trigger event indicating heavy action in the first concurrent video stream;

modifying, by the one or more processors of the machine, the accessed plurality of concurrent video streams by adding the generated second concurrent video stream to the accessed plurality of concurrent video streams that includes the first concurrent video stream, each concurrent video stream in the modified plurality of concurrent video streams being displayable in a corresponding different window among the set of windows to be displayed on the display screen; and providing, by the one or more processors of the machine, the modified plurality of concurrent video streams to a device configured to display the modified plurality of concurrent video streams concurrently together in the corresponding different windows among the set of windows on the display screen.

2. The method of claim 1, wherein:
the accessing of the plurality of concurrent video streams is performed as all or part of accessing a multiwindow media stream that includes the plurality of concurrent video streams;
the modifying of the accessed plurality of concurrent video streams is performed as all or part of modifying the multiwindow media stream that includes the accessed plurality of concurrent video streams; and
the providing of the modified plurality of concurrent video streams to the device is performed as all or part of providing the modified multiwindow media stream to the device.

3. The method of claim 1, further comprising:
recognizing a face depicted in the first concurrent video stream; and wherein:
the automatic selecting of the multiple video content items for inclusion in the second concurrent video stream being generated is based on the recognized face; and
the generating of the second concurrent video stream includes insertion of the multiple video content items, automatically selected based on the recognized face depicted in the first concurrent video stream, into the second concurrent video stream being generated.

4. The method of claim 1, further comprising:
recognizing a type of content included in the first concurrent video stream, the type of content including at least one of a face, a logo, an image, a shape, a sound, or an audio; and wherein:
the automatic selecting of the multiple video content items for inclusion in the second concurrent video being generated is based on the recognized type of content; and
the generating of the second concurrent video stream includes insertion of the multiple video content items, automatically selected based on the recognized type of content included in the first concurrent video stream, into the second concurrent video stream being generated.

5. The method of claim 1, further comprising:
recognizing a logo depicted in the first concurrent video stream; and wherein:
the automatic selecting of the multiple video content items for inclusion in the second concurrent video stream being generated is based on the recognized logo; and
the generating of the second concurrent video stream includes insertion of the multiple video content items, automatically selected based on the recognized logo depicted in the first concurrent video stream, into the second concurrent video stream being generated.

6. The method of claim 1, further comprising:
detecting a visual trigger event represented in the first concurrent video stream; and wherein:
the automatic selecting of the multiple video content items for inclusion in the second concurrent video stream being generated is based on the detected visual trigger event; and
the generating of the second concurrent video stream includes insertion of the multiple video content items, automatically selected based on the detected visual trigger event represented in the first concurrent video stream, into the second concurrent video stream being generated.

7. The method of claim 1, further comprising:
detecting an audio trigger event represented in an audio track of the first concurrent video stream; and wherein:
the automatic selecting of the multiple video content items for inclusion in the second concurrent video stream being generated is based on the detected audio trigger event; and
the generating of the second concurrent video stream includes insertion of the multiple video content items, automatically selected based on the detected audio trigger event represented in the audio track of the first concurrent video stream, into the second concurrent video stream being generated.

8. The method of claim 7, wherein:
the detected audio trigger event includes at least one of:
background volume transgressing a first threshold volume;
speech volume transgressing a second threshold volume; or
voice recognition of a trigger phrase.

9. The method of claim 1, wherein:
the automatic selecting of the multiple video content items includes automatically selecting an associated media content item, the associated media content item including at least one of a social media feed, a promotion item, a news item, a text item, a video clip, or a fan engagement item, based on the maximum weighted trigger event represented in the first concurrent video stream and determined using the trained machine-learning model; and
the generating of the second concurrent video stream includes insertion of at least a portion of the associated media content item, automatically selected based on the determined maximum weighted trigger event represented in the first concurrent video stream, into the second concurrent video stream being generated.

10. The method of claim 9, further comprising:
filtering the selected social media feed based on the determined maximum weighted trigger event, the filtering of the selected social media feed obtaining the portion of the social media feed for insertion into the second concurrent video stream being generated.

11. The method of claim 1, wherein:
the automatic selecting of the multiple video content items automatically selects video content that depicts an alternate camera angle relative to the first concurrent video stream; and
the generating of the second concurrent video stream includes insertion of the automatically selected video content that depicts the alternate camera angle relative to the first concurrent video stream into the second concurrent video stream.

12. The method of claim 1, further comprising:
the automatic selecting of the multiple video content items includes automatically selecting a plurality of video segments, for inclusion in the second concurrent video stream being generated, based on the detecting that the first concurrent video stream having been detected as selected for display in the primary window among the set of windows; and
pre-fetching the automatically selected plurality of video segments prior to the generating of the second concurrent video stream to be added to the accessed plurality of concurrent video streams.

13. A non-transitory machine-readable storage medium comprising instructions that, when executed by one or more processors of a machine, cause the machine to perform operations comprising:

accessing a plurality of concurrent video streams to be displayed concurrently together on a display screen, the plurality of concurrent video streams including a first concurrent video stream;

detecting that the first concurrent video stream among the accessed plurality of concurrent video streams is selected for display in a primary window among a set of windows to be displayed on the display screen;

detecting multiple trigger events represented in the first concurrent video stream;

determining, using a trained machine-learning model, a maximum weighted trigger event among the detected multiple trigger events represented in the first concurrent video stream;

automatically selecting, without user input, multiple video content items from a pool of available video content items for inclusion of the automatically selected multiple video content items in a second concurrent video stream to be generated from the multiple video content items and then added to the accessed plurality of concurrent video streams that includes the first concurrent video stream selected for display in the primary window, the automatic selecting of the multiple video content items being based on the maximum weight trigger event determined using the trained machine-learning model;

generating, based on the first concurrent video stream being selected for display in the primary window, the second concurrent video stream to be added to the accessed plurality of concurrent video streams by inserting the automatically selected multiple video content items into the second concurrent video stream based on a first detection of a first trigger event indicating light action in the first concurrent video stream and suspending the inserting of the automatically selected multiple video content items based on a second detection of a second trigger event indicating heavy action in the first concurrent video stream;

modifying the accessed plurality of concurrent video streams by adding the generated second concurrent video stream to the accessed plurality of concurrent video streams that includes the first concurrent video stream, each concurrent video stream in the modified plurality of concurrent video streams being displayable in a corresponding different window among the set of windows to be displayed on the display screen; and providing the modified plurality of concurrent video streams to a device configured to display the modified plurality of concurrent video streams concurrently together in the corresponding different windows among the set of windows on the display screen.

14. The non-transitory machine-readable storage medium of claim 13, wherein the operations further comprise:

recognizing a type of content included in the first concurrent video stream, the type of content including at least one of a face, a logo, an image, a shape, a sound, or an audio; and wherein:

the automatic selecting of the multiple video content items for inclusion in the second concurrent video being generated is based on the recognized type of content; and the generating of the second concurrent video stream includes insertion of the multiple video content items, automatically selected based on the recognized type of content included in the first concurrent video stream, into the second concurrent video stream being generated.

15. The non-transitory machine-readable storage medium of claim 13, wherein the operations further comprise:

recognizing a face depicted in the first concurrent video stream; and wherein:

the automatic selecting of the multiple video content items for inclusion in the second concurrent video stream being generated is based on the recognized face; and the generating of the second concurrent video stream includes insertion of the multiple video content items, automatically selected based on the recognized face depicted in the first concurrent video stream, into the second concurrent video stream being generated.

16. The non-transitory machine-readable storage medium of claim 13, wherein the operations further comprise:

recognizing a logo depicted in the first concurrent video stream; and wherein:

the automatic selecting of the multiple video content items for inclusion in the second concurrent video stream being generated is based on the recognized logo; and the generating of the second concurrent video stream includes insertion of the multiple video content items, automatically selected based on the recognized logo depicted in the first concurrent video stream, into the second concurrent video stream being generated.

17. The non-transitory machine-readable storage medium of claim 13, wherein:

the automatic selecting of the multiple video content items includes automatically selecting an associated media content item, the associated media content item including at least one of a social media feed, a promotion item, a news item, a text item, a video clip, or a fan engagement item, based on the maximum weighted trigger event represented in the first concurrent video stream and determined using the trained machine-learning model; and the generating of the second concurrent video stream includes insertion of at least a portion of the associated media content item, automatically selected based on the determined maximum weighted trigger event represented in the first concurrent video stream, into the second concurrent video stream being generated.

18. A system comprising:

one or more processors; and a memory storing instructions that, when executed by at least one processor among the one or more processors, cause the system to perform operations comprising:

accessing a plurality of concurrent video streams to be displayed concurrently together on a display screen, the plurality of concurrent video streams including a first concurrent video stream;

detecting that the first concurrent video stream among the accessed plurality of concurrent video streams is selected for display in a primary window among a set of windows to be displayed on the display screen;

detecting multiple trigger events represented in the first concurrent video stream;

determining, using a trained machine-learning model, a maximum weighted trigger event among the detected multiple trigger events represented in the first concurrent video stream;

automatically selecting, without user input, multiple video content items from a pool of available video content items for inclusion of the automatically selected multiple video content items in a second concurrent video stream to be generated from the multiple video content items and then added to the accessed plurality of concurrent video streams that includes the first concurrent video stream selected for display in the primary window, the automatic selecting of the multiple video content items being based on the maximum weight trigger event determined using the trained machine-learning model;

generating, based on the first concurrent video stream being selected for display in the primary window, the second concurrent video stream to be added to the accessed plurality of concurrent video streams by inserting the automatically selected multiple video content items into the second concurrent video stream based on a first detection of a first trigger event indicating light action in the first concurrent video stream and suspending the inserting of the automatically selected multiple video content items based on a second detection of a second trigger event indicating heavy action in the first concurrent video stream;

modifying the accessed plurality of concurrent video streams by adding the generated second concurrent video stream to the accessed plurality of concurrent video streams that includes the first concurrent video stream, each concurrent video stream in the modified plurality of concurrent video streams being displayable in a corresponding different window among the set of windows to be displayed on the display screen; and providing the modified plurality of concurrent video streams to a device configured to display the modified plurality of concurrent video streams concurrently together in the corresponding different windows among the set of windows on the display screen.

19. The system of claim 18, wherein the operations further comprise:

recognizing a face depicted in the first concurrent video stream; and wherein:

the automatic selecting of the multiple video content items for inclusion in the second concurrent video stream being generated is based on the recognized face; and the generating of the second concurrent video stream includes insertion of the multiple video content items, automatically selected based on the recognized face depicted in the first concurrent video stream, into the second concurrent video stream being generated.

20. The system of claim 18, wherein the operations further comprise:

detecting a visual trigger event represented in the first concurrent video stream; and wherein:

the automatic selecting of the multiple video content items for inclusion in the second concurrent video stream being generated is based on the detected visual trigger event; and the generating of the second concurrent video stream includes insertion of the multiple video content items, automatically selected based on the detected visual trigger event represented in the first concurrent video stream, into the second concurrent video stream being generated.

* * * * *

UNITED STATES PATENT AND TRADEMARK OFFICE
CERTIFICATE OF CORRECTION

PATENT NO. : 11,800,179 B2
APPLICATION NO. : 17/111211
DATED : October 24, 2023
INVENTOR(S) : Ward et al.

It is certified that error appears in the above-identified patent and that said Letters Patent is hereby corrected as shown below:

In the Specification

In Column 4, Line 23, delete "(MIR)" and insert --(MR)-- therefor

In Column 6, Line 34, delete "sonic" and insert --some-- therefor

In Column 7, Line 9, delete "sonic" and insert --some-- therefor

In Column 9, Line 54, delete "118-point" and insert --18-point-- therefor

In Column 9, Line 55, delete "Opportune" and insert --opportune-- therefor

In Column 10, Line 2, delete "sonic" and insert --some-- therefor

In Column 12, Line 50, delete "streams/" and insert --streams.-- therefor

In Column 12, Line 58, after "stream", insert --(e.g.,--

In Column 13, Line 35, delete "1200" and insert --1000-- therefor

In Column 14, Line 23, delete "(LEI))" and insert --(LED)-- therefor

In Column 16, Lines 15-16, delete "module," and insert --module.-- therefor

In Column 16, Line 35, before "e.g.,", insert --(--

In Column 17, Line 3, before "e.g.,", insert --(--

Signed and Sealed this
Twelfth Day of December, 2023

Katherine Kelly Vidal
*Director of the United States Patent and Trademark Office*